(12) United States Patent
Klee

(10) Patent No.: US 7,565,912 B2
(45) Date of Patent: Jul. 28, 2009

(54) FROST-PROOF EXTERIOR-WALL VALVE

(75) Inventor: Klaus Klee, Scheessel (DE)

(73) Assignee: Interforge KleeGmbH, Rotenburg, Wumme (DE)

( * ) Notice: Subject to any disclaimer, the term of this patent is extended or adjusted under 35 U.S.C. 154(b) by 284 days.

(21) Appl. No.: 11/387,989

(22) Filed: Mar. 23, 2006

(65) Prior Publication Data

US 2006/0266418 A1 Nov. 30, 2006

(30) Foreign Application Priority Data

May 27, 2005 (DE) .................. 20 2005 008 464 U
Nov. 30, 2005 (DE) .................. 20 2005 017 350 U

(51) Int. Cl.
*F16L 5/00* (2006.01)
*F16K 1/20* (2006.01)
*A62B 9/02* (2006.01)
*F16K 11/18* (2006.01)

(52) U.S. Cl. ............. 137/360; 137/614.11; 137/601.01; 137/636.4

(58) Field of Classification Search ................. 137/360, 137/216, 301, 218, 304, 321, 614.11, 601.01, 137/636.4, 637.1, 637.4, 614.12, 629, 599.11, 137/599.16, 599.17, 599.18
See application file for complete search history.

(56) References Cited

U.S. PATENT DOCUMENTS 1,606,478 A 11/1926 McKamey
3,012,584 A 12/1961 Perow et al.
3,952,770 A 4/1976 Botnick
4,178,956 A * 12/1979 Fillman ....................... 137/360
4,182,356 A 1/1980 Woodford, Sr.
4,316,481 A 2/1982 Fillman
4,454,890 A 6/1984 Schoenheimer et al.
4,844,116 A 7/1989 Buehler et al.
5,718,257 A * 2/1998 Burgess ....................... 137/218
6,532,986 B1 3/2003 Dickey et al.
6,752,167 B1 6/2004 Stanaland et al.
6,769,446 B1 8/2004 Ball et al.
7,140,390 B2 * 11/2006 Berkman et al. ......... 137/614.2

FOREIGN PATENT DOCUMENTS

| DE | 199 12 677 A1 | 10/2000 |
| DE | 202 03 757 U1 | 8/2002 |
| DE | 202 19 008 U1 | 5/2004 |
| DE | 103 15 224 A1 | 10/2004 |
| EP | 1 347 104 A2 | 9/2003 |
| GB | 442055 | 1/1936 |
| GB | 2 328 985 A | 3/1999 |
| WO | WO 3098083 A1 * | 11/2003 |
| WO | WO 2004/094879 A1 | 11/2004 |

* cited by examiner

*Primary Examiner*—Stephen M Hepperle
*Assistant Examiner*—Atif H Chaudry
(74) *Attorney, Agent, or Firm*—Merchant & Gould P.C.

(57) ABSTRACT

A frost-proof valve includes a main valve. The main valve opens a fluid connection between an inflow opening and a discharge opening through a connecting channel in an open position and blocks the channel in a closed position. An actuating mechanism switches the main valve between the open position and the closed position. A drain drains the valve in the closed position and includes a bypass line connecting first and second channel sections.

26 Claims, 5 Drawing Sheets ic # FROST-PROOF EXTERIOR-WALL VALVE

TECHNICAL FIELD

The invention relates to frost-proof valves for exterior use.

BACKGROUND

A prior art frost-proof valve is shown in DE 202 19 008, the entire disclosed content of which is hereby included by reference for the purpose of disclosure. In this prior-art frost-proof exterior-wall valve, frost resistance is achieved by ventilating the interior of the valve device via a ventilation valve after the main valve has been closed. The ventilation valve of the prior-art valve device is a spring-loaded valve, which closes due to the internal pressure of the valve device when the main valve is open, and with decreasing internal pressure is moved into the open position by a pressure spring, allowing air to access the valve interior and causing water contained therein to drain via the discharge opening.

This valve device can allow reliable frost-proof operation. However, the inventor has determined that it can be further improved.

For valve devices connected to the public water supply network in the area of potable water supply, it is of advantage, and in some countries even required by statutory regulations, for a backflow prevention valve to be present, which serves to prevent feeding contaminated water into the water supply network through the valve against its flow direction. Such backflow prevention valves are usually embodied as spring-loaded check valves. However, when balancing the spring force of such a backflow prevention valve and of the ventilation valve of the prior-art frost-proof exterior-wall valve, it can be a challenge to balance the spring forces to achieve both a reliable backflow prevention on the one hand and a reliable opening of the ventilation valve in the un-pressurized state on the other.

There exists a need to further develop this prior-art valve, so as to guarantee frost-proof exterior use and at the same time to allow coupling a backflow prevention valve with the valve device or integrating it into the valve device, without creating any adverse effects on functionality.

SUMMARY OF THE INVENTION

One aspect of the invention provides a valve device for frost-proof exterior use, comprising:
  an inflow opening,
  a discharge opening,
  a connecting channel, which connects the inflow opening to the discharge opening,
  a main valve, which is embodied so that it unblocks the fluid connection through the connecting channel in an open operating position and blocks the fluid connection in a closed operating position,
  an actuating mechanism for actuating the main valve, and
  draining means to drain the valve device in the closed operating position,
  characterized in that the draining means comprises a bypass line, which connects a first connecting channel section to a second connecting channel section.

The valve device according to one embodiment of the invention eliminates the need for two spring-activated valves within the valve device and thus allows both a reliable ventilation of the connecting channel in the blocked state as well as safe backflow prevention. The bypass line enables a ventilation flow between the connecting channel sections, which creates the pressure conditions for a complete draining/ventilation of the connecting channel in the frost-endangered region.

Surprisingly, it has been shown that the valve device according to one embodiment of the invention offers excellent reliability even in the case of a hose pipe connected to the discharge opening of the valve device or any other connected device that can generate a pressurized state in the valve device. For example, in practical application a first end of a hose may be connected to the discharge opening of the valve device while the second end of the hose is equipped with a shut-off device. In this case, a pressurized state can be maintained in the hose and the valve device, irrespective of whether the main valve of the valve device is open or closed, by closing or throttling the shut-off device at the second end of the hose.

In such cases, the valve device according to one embodiment of the invention prevents any undesired discharges of liquid via the draining means resulting from the external pressurization.

A further development according to one embodiment of the invention provides safety against such a liquid discharge by applying to both sides of the bypass line the pressure that prevails in the interior of the connecting channel or in a hose pipe connected thereto. In this manner pressure in effect in the valve device is prevented from leading to a fluid discharge from the valve device, since the draining means via the bypass line forms a closed cycle with respect to the environment of the valve device.

In this it is especially preferred for the second connecting channel section in the installed position of the valve device to be situated above, with respect to the direction of gravity, the first connecting channel section. Consequently, the hydrostatic force acting upon the aperture of the bypass line that opens into the first connecting channel section is lower than the force acting upon the aperture of the bypass line that opens into the second connecting channel section. As a result, an air flow can develop from the discharge opening to the second connecting channel section, from there through the bypass line, and via the bypass line into the first connecting channel section, facilitating effective ventilation of the connecting channel.

It is also advantageous, for the bypass line to connect a first connecting channel section to a ventilation space, which in turn is connected to the second connecting channel section. This ventilation space provides an air reservoir that leads to more uniform ventilation flow and consequently to a more uniform flow of draining fluid.

In particular, the bypass line is preferably formed in a section of the housing wall of the valve device and, in the installed position of the valve device, the bypass line extends at least partially downwardly along the direction of gravity from the ventilation space towards the discharge opening. This eliminates the risk of liquid accumulating in the ventilation space and/or in the bypass line.

In some situations it is preferred for the bypass line to connect the first and second connecting channel section for all positions of the actuating mechanism. For example, the bypass line may connect the connecting channel sections via continuous ventilation channels without any valves or other devices contained therein.

In some situations it is preferred for the draining means to comprise a ventilation valve in the bypass line. Such a ventilation valve can be used to securely close the bypass line, either manually or by means of application of spring force or pressure, making it possible in certain operating positions to reliably prevent a flow from passing through the bypass line.

In its open position, the ventilation valve allows ambient air access into the connecting channel for the purpose of draining the fluid from the connecting channel, while in a closed position it prevents any flow of air or liquid through the bypass line. This facilitates reliable ventilation on the one hand and prevents any undesirable discharge of water from the valve device—when this is not intended—on the other hand.

In embodiments which comprise a ventilation valve, it is particularly preferred for the ventilation valve to comprise a valve seat and a valve body. In a first position of an actuating mechanism on a first travel track the valve body is pressed onto the valve seat and in a second position of the actuating mechanism on the first travel track the valve body is lifted off the valve seat. In this manner, the ventilation valve is actuated directly by the movement of the actuating mechanism along the first travel track and is moved to defined positions for ventilation or for preventing liquid discharge from the interior.

Another significant further development of the valve device according to one embodiment of the invention is that the actuating means is configured such that the draining means for draining the valve device is opened and closed by moving the actuating mechanism along the first travel track whereas the main valve is opened and closed by moving the actuating mechanism along a second travel track.

This further development according to this embodiment of the invention falls back on a special—only partially autonomous—actuation of the draining means and does not require a spring-actuated automatic actuation of the draining means. This further development offers the advantage that the manual actuation of the draining means may be handled using the same actuating means that also serve in opening and closing the main valve. In this, two different travel tracks—one for opening the main valve and one for draining the valve device—offer the user a safe and easy-to-understand actuation of the valve device according to this embodiment of the invention. Moreover, moving the actuating means along two separate travel tracks realizes a particularly simple and robust design of the valve device, which further increases operational reliability and durability.

In the context of this embodiment of the invention, the first travel track is to be understood as a rotary, translatory, or in other manner directed movement of the actuating mechanism or of a part of the actuating mechanism. Analogously, the second travel track is to be understood as a rotary, translatory, or other-directed movement of the actuating mechanism or of the same above-mentioned part of the actuating mechanism. According to this embodiment of the invention, the first and second travel tracks possess different orientations, however movements can be performed along both travel tracks in one direction and in the direction opposite thereto, in order to perform an opening movement and a closing movement by moving in opposite directions along the same travel track.

A particularly favourable configuration of the valve device according to one embodiment of the invention comprises the above-described ventilation valve and the above-described actuating means for moving the actuating mechanism along first and second travel tracks. This allows the first travel track to serve for the actuation of the ventilation valve while the second travel track serves in actuating the main valve. This facilitates a reliable and for a user easy-to-understand actuation of the ventilation valve and the main valve by operating a single actuating mechanism. The ventilation valve preferably is actuated directly by moving the actuating mechanism along the first travel track.

In an especially preferred embodiment the second travel track is a rotary travel track and the first travel track is a translatory travel track oriented axially relative to the second travel track. This offers the user an intuitive operation of the invention's valve device, namely by performing the actual opening and closing of the main valve using a customary rotary motion and the opening and closing of the draining means using an axial translatory motion.

It is also preferred in some embodiments of the invention for the actuating mechanism to comprise a single actuating element moveable along the two travel tracks. Such an actuating element can for example be a turning knob, pull or push button, or a swivelling lever.

It is also preferred in some embodiments of the invention for the draining means to have a ventilation opening, which allows access of ambient air into the connecting channel for the purpose of draining the liquid from the connecting channel, preferably via the discharge opening. This allows a reliable ventilation of the interior of the valve device.

It is also preferred in some embodiments of the invention for the valve device to comprise a guiding mechanism to guide the actuating mechanism along the first and second travel tracks. Such a guiding mechanism can be provided in the form of a swivel or rotational axle, a sliding track, or similar, and is particularly preferred, since it aids in ruling out operator error by allowing only movements of the actuating mechanism along one of the guided directions. In this way one can reliably guarantee a predetermined direction of movement and a predetermined sequence of movement, which can serve to cycle through definite functional states of the valve device according to a predetermined sequence.

In such embodiments it is especially preferred for the guiding mechanism to guide the actuating mechanism from a first closed position, in which the main valve is closed and the draining means is in a drain position, along a first direction on the first travel track into a second position, in which the main valve is closed and the draining means is in a non-drain position in a first actuating phase. In a second actuating phase the guiding mechanism guides the actuating mechanism along a first direction on the second travel track into a third, open position, in which the main valve is open and the draining means are in a non-drain position. In this way, starting from a closed position of the main valve, one at first brings the draining means into a position where no draining can take place, e.g. the ventilation valve is closed, and subsequently in a second actuating phase the main valve is opened, whereby the draining means remain in the previously set position, e.g. the ventilation valve remains closed. This reliably prevents liquid from penetrating along the draining means in the open position of the main valve, i.e. escaping to the surroundings via the ventilation valve.

It is further preferred for the guiding mechanism, in a third actuating phase, to guide the actuating mechanism from the third, open position along a second direction on the second travel track—opposite to the movement of the second actuating phase—back to the second position, and in a fourth actuating phase to guide the actuating mechanism along a second direction on the first travel track—opposite to the movement of the first actuating phase—back to the first position. In this way, when a user intuitively operates the actuating mechanism in the opposite order and direction than before, he arrives at the original closed state of the main valve and achieves draining of the interior of the valve device.

It is further preferred for the actuating means to comprise a connecting-link guide. A connecting-link guide is especially suitable for a safe, dependable and cost-effective embodiment of the guiding means for the actuating means and can provide a large number of travel tracks.

In this embodiment, it is particularly preferred for the connecting-link guide to comprise at least one pin, which is connected to a housing section of the valve device or is connected to an actuating button of the actuating means, and a guide-pin track to guide the pin, which accordingly is embodied at the actuating button of the actuating means or at the housing of the valve device. Such a type of connecting-link guide is favourably suitable for the purposes of the valve device according to some embodiments of the invention and can be arranged in a space-saving manner in the region of the actuating mechanism.

In some embodiments of the invention the main valve preferably comprises a sliding valve, and in particular a rotary slide valve.

This further development is based on the realization that a certain discharge of water from the discharge opening or outlet is unavoidable in frost-proof valves and consequently other ways must be found to rule out maloperation. This is achieved by providing a completely different feel to the user in the actuation of the valve device. The configuration of the main valve as sliding valve imparts to the user that in a precisely defined lock position the valve will be closed and even additional force will not close it further. In this way one can prevent the user from attempting to operate the valve device with unacceptably high force.

It is particularly preferred for the main valve to comprise rotary slide valve. This configuration is particularly advantageous for the design of the valve devices according to some embodiments of the invention, since it allows a simple and reliable transfer of the actuating forces from the actuating mechanism to the main valve and allows realization of the customary rotary movement as the second travel track.

Moreover, the valve device according to some embodiments of the invention offers the advantage that with a sliding valve the user will not be able to exert excessive force to press the sealing faces together. A sliding valve is fundamentally characterized in that the flow aperture(s) are closed by executing a shear motion between the sealing body and the flow aperture(s), which is typically a sliding or rotating movement perpendicular to the flow direction. Consequently the sealing faces are never moved vertically toward each other and a greater actuating force does not result in a greater contact pressure between the sealing faces. This prevents damage to the sealing faces as a result of such an operating error.

Details and the advantages of the design of the main valve will be apparent from the description for claim 1 and the prior art embodiment shown in DE 20 2005 008 464.

In some embodiments of the invention, it is particularly preferred for the main valve to comprise a first valve element with at least one flow aperture and a second valve element that is rotatable about an axis and possesses at least one eccentric sealing face, which seals the flow aperture(s) of the first valve element in the closed operating position. This configuration allows a robust design and reliable sealing of the first valve of the valve device.

In such embodiments, it is particularly preferred for the first valve element and the second valve element to be separated by the same axial distance from each other in the open and the closed operating positions. This simplifies as far as possible the motion of the first and second valve elements relative to each other and achieves a robust design of the valve device.

In some embodiments, it is particularly advantageous for the first valve element to be embodied as a disk with two eccentric openings. The two eccentric openings provide an adequate flow area through the first valve element, whereby the openings are still of sufficient size to be insensitive to dirt accumulation and calcification. In such embodiments, the second valve element preferably comprises two sealing faces, which are arranged eccentrically, corresponding to the openings in the first valve element. These openings preferably are offset by 180° relative to each other and each extends over an angular range of approximately 90°.

It is particularly preferred if the main valve possesses at least one valve element of a ceramic material, preferably two valve elements of a ceramic material. Ceramic materials are especially well suited for the valve device according to some embodiments of the invention because they allow virtually wear-free operation and the forces occurring in a sliding valve are of appropriate levels for ceramic materials, thus allowing reliable operation over the lifetime of the valve device without requiring any maintenance procedures for the main valve.

It is further preferred in some embodiments of the invention if the actuating mechanism has to be turned by approximately 90° from the first operating position to reach the second operating position. In this way the user of the valve device receives unambiguous visual and tactile feedback that the open or closed operating position has been reached. This configuration is especially advantageous in cases where the actuating mechanism is embodied as swivelling lever or rotary handle.

The valve device according to some embodiments of the invention is preferably designed for horizontal installation into an exterior wall. This configuration is particularly advantageous for the valve device according to some embodiments of the invention if ventilation is realized for the most part by discharging water from the discharge opening and as a result the advantages provided by the invention can play a particularly important role.

It is further preferred that the actuating mechanism comprises a manually actuatable handle element, which acts together with a connecting rod that extends through part of the connecting channel, in order to transfer the motion along the first travel track to the main valve. This allows performing manual actuation in an exterior frost-prone region and arranging the main valve in the interior frost-proof region, which increases frost-resistance even further. Moreover, one attains a slender and robust design.

Another further development according to one embodiment of the invention is characterized by a first backflow prevention device arranged between the inflow opening and the main valve, to prevent polluted water from leaking from the valve device via the inflow opening. This configuration is advantageous for application of the valve device according to some embodiments of the invention in public water supply networks in order to meet regulations for fittings in such supply networks and to prevent water in the valve device from reaching the water supply in the event of excess pressure in the valve device.

A preferred embodiment will be described with the help of the enclosed figures.

DESCRIPTION

Figure 1:
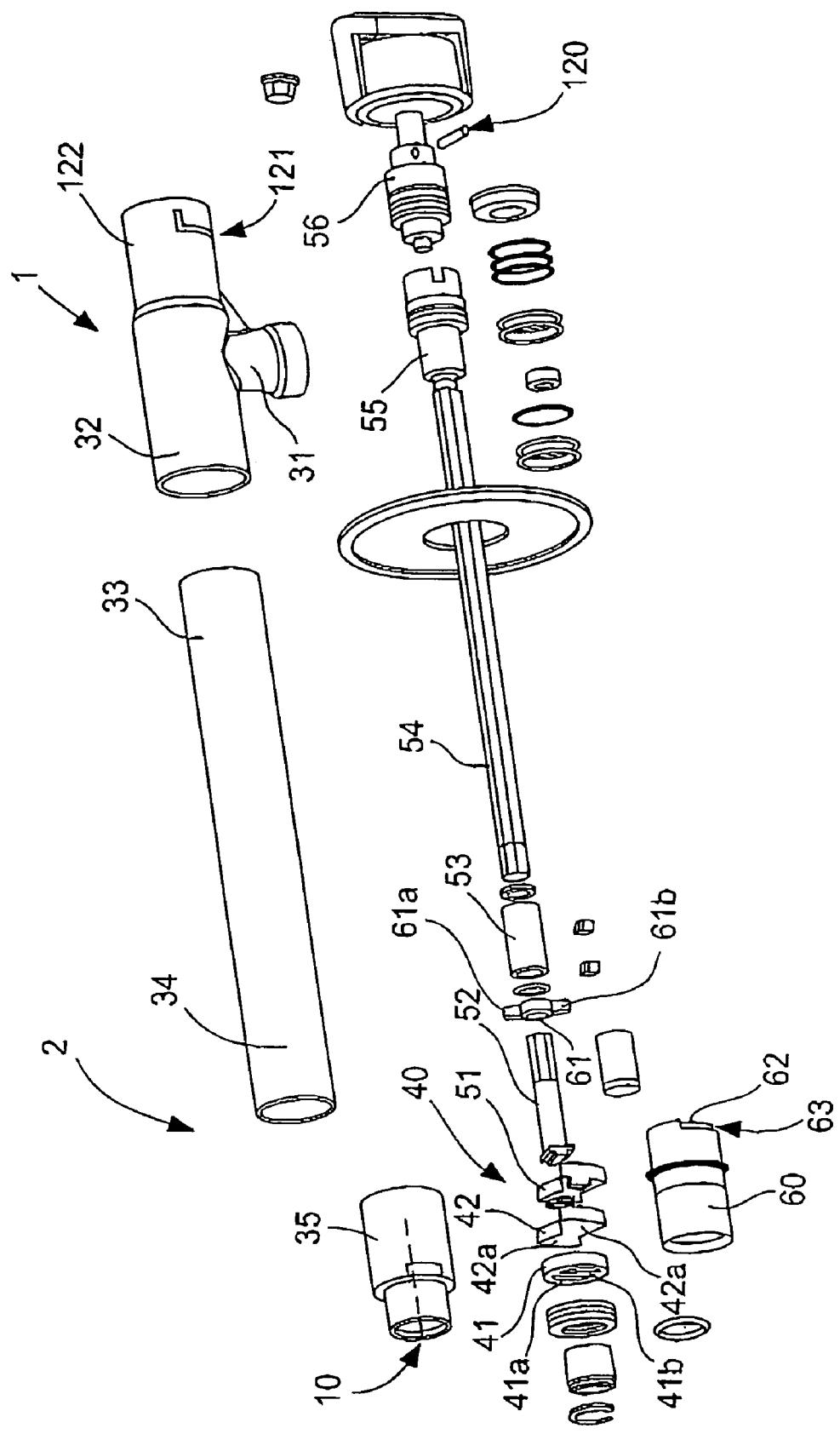
FIG. 1 shows an exploded view of a valve device according to a preferred embodiment of the invention.
Figure 2:
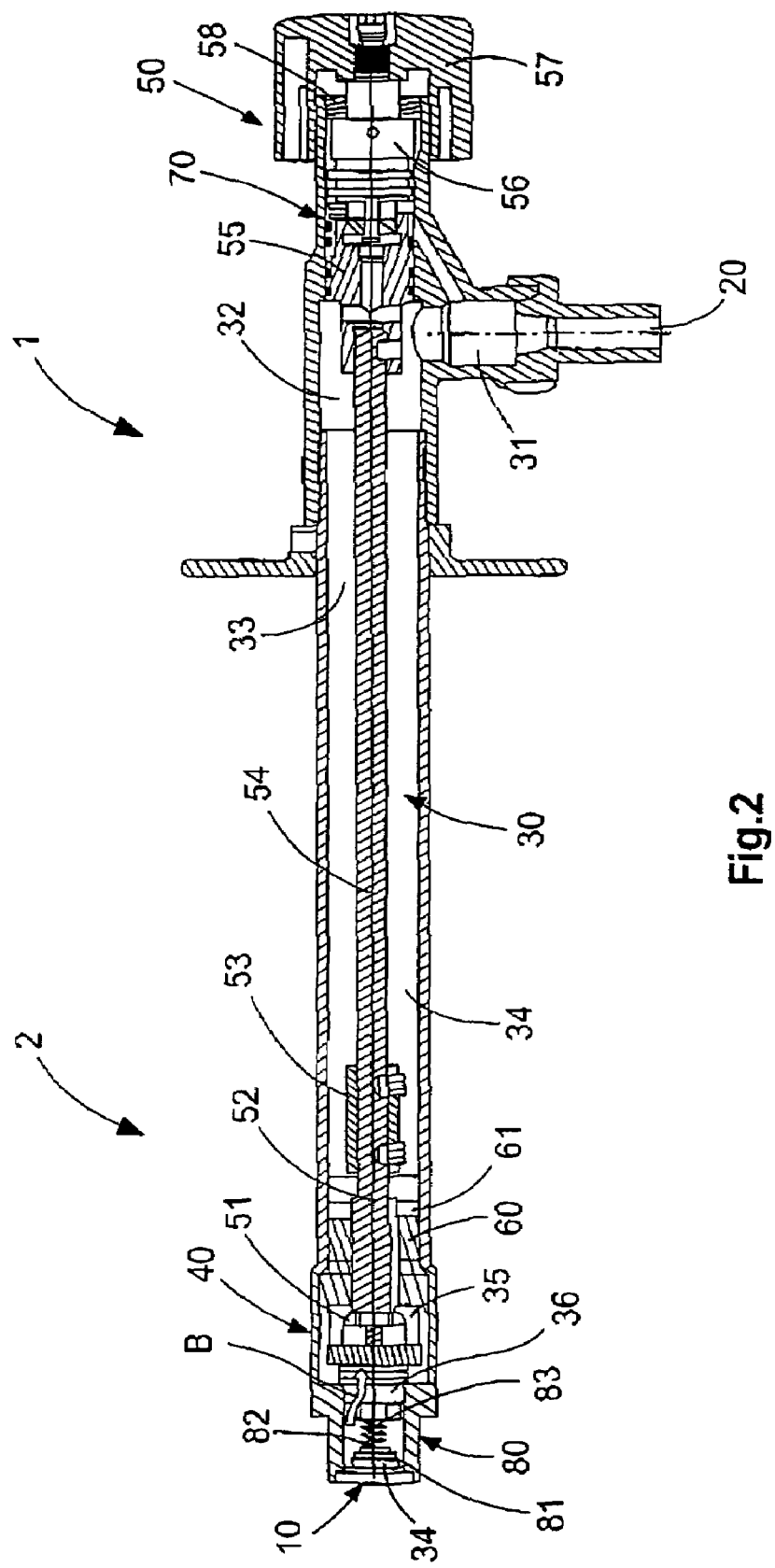
FIG. 2 shows a side view of a longitudinal section of the valve device of FIG. 1 in a closed position with open ventilation valve.

As shown in FIGS. 1 and 2, the valve device according to the preferred embodiment of the invention comprises an exterior section 1 and an interior section 2.

Arranged in the exterior section 1 are a discharge opening 20, an actuating mechanism 50, as well as a connecting channel 30 with exterior connecting channel sections 31-33.

Arranged in the interior section 2 are an inflow opening 10, a main valve 40, as well as lower connecting channel sections 34-36 of the connecting channel 30.

In the installed position, the interior section 2 is arranged in a wall or interior of a building while the exterior section 1 is arranged outside of the wall in the exterior where it is exposed to ambient temperatures. In the installed position, the discharge opening 20 faces downward along the direction of gravity.

FIG. 2 shows the valve device with its main valve 40 closed. The main valve 40 comprises a first valve element 41, which is embodied as ceramic disk and possesses two eccentric bores 41a,b. The main valve 40 also comprises a second valve element 42, with a cross section in the shape of two triangles, which are in contact by their points and are shaped as semicircles on the sides opposite to these points. The triangular surfaces of the second valve element 42 form two valve sealing faces 42a,b, which are dimensioned so that they can seal first and second openings in the first valve element 41.

In its closed position, the main valve 40 prevents water from the inflow opening 10 from reaching the connecting channel 30, by rotating the first valve element 41 relative to the second valve element 42 in such a manner that the two eccentric bores 41a,b come to rest upon the two valve sealing faces 42a,b of the second valve element and are sealed by them.

Turning the first valve element 41 by 90° with respect to the longitudinal axis of the valve device causes the two eccentric bores 41a,b to become aligned with two corresponding openings in the second valve element 42, so that water can flow from the inflow opening, through the valve device, to the discharge opening.

For this, the water enters the valve device in the horizontal direction via the inflow opening 10. It then passes a check valve 80 arranged downstream of the inflow opening. The check valve 80 comprises a valve seat 81, into which a valve body 82 is pressed by means of a pressure spring 83. The water pressure exerts a force counteracting the pressure spring 83 upon the valve body surface 84 and thus lifts the valve body 82 from the valve seat 81, which allows the inflow of water.

The water then flows in the direction of the main valve 40 as indicated by arrow B.

The second valve element 42 is connected rotationally rigidly to a coupling element 51, which in turn is connected rotationally rigidly by means of a key and slot connection to a first end of a short actuating rod 52. At its other end, the short actuating rod 52 is hexagonal in cross-section and is connected rotationally rigidly by means of a hexagon socket sleeve 53 to a long actuating rod 54, which also possess a hexagonal cross-section.

At its other end, the long actuating rod is attached, by means of an adapter element 55, rotationally rigidly but axially moveably to a valve sleeve 56, which in turn is connected rotationally rigidly to an actuating knob 57. In this way, a torque applied to the actuating knob 57 can be transferred to the second valve element 42, in order to rotate the second valve element 42 accordingly and to move the main valve 40 from the closed operating position to the open operating position, and in reverse.

The actuating knob 57 together with the valve sleeve 56 is axially movable relative to the remaining components of the valve device. The valve sleeve 56 is secured against being pulled out of the valve device in the direction of the actuating knob by a sleeve nut 58 with an outside thread, which is screwed into a corresponding inside thread in a wall section 122 of the housing of the valve device.

The main valve 40 is arranged in a pipe section 35, which is screwed to a pipe section 33,34. The short and long actuating rods 52, 54 extend through the pipe section 33,34 and connect the main valve 40 to the actuating knob 57 situated at a pipe end.

The pipe section 35 and the pipe section 33,34 are connected to each other by means of an adapter sleeve 60, by screwing the pipe sections 35 and 33,34 with their respective inside threads onto a corresponding outside thread of the adapter sleeve 60. The adapter sleeve 60 interacts with a stop piece 61, which is pushed rotationally rigidly onto the hexagonal section of the short actuating rod 52 by means of a hexagon socket, and which comprises two arms 61a,b extending radially. The arms 61a,b interact with end stops 62 and 63 of the adapter sleeve 60 and in this manner limit the rotating angle of the short actuating rod 52, and consequently of the entire actuating mechanism, to 90°.

The stop element 61 is oriented relative to the second valve element 42 in such a way so that—together with a corresponding orientation of the adapter sleeve 60 relative to the first valve element 41—the main valve 40 is closed in the end stop position shown in FIGS. 1 and 2 and is open in the other end stop position reachable by rotating the actuating rod by 90°.

Figure 3:
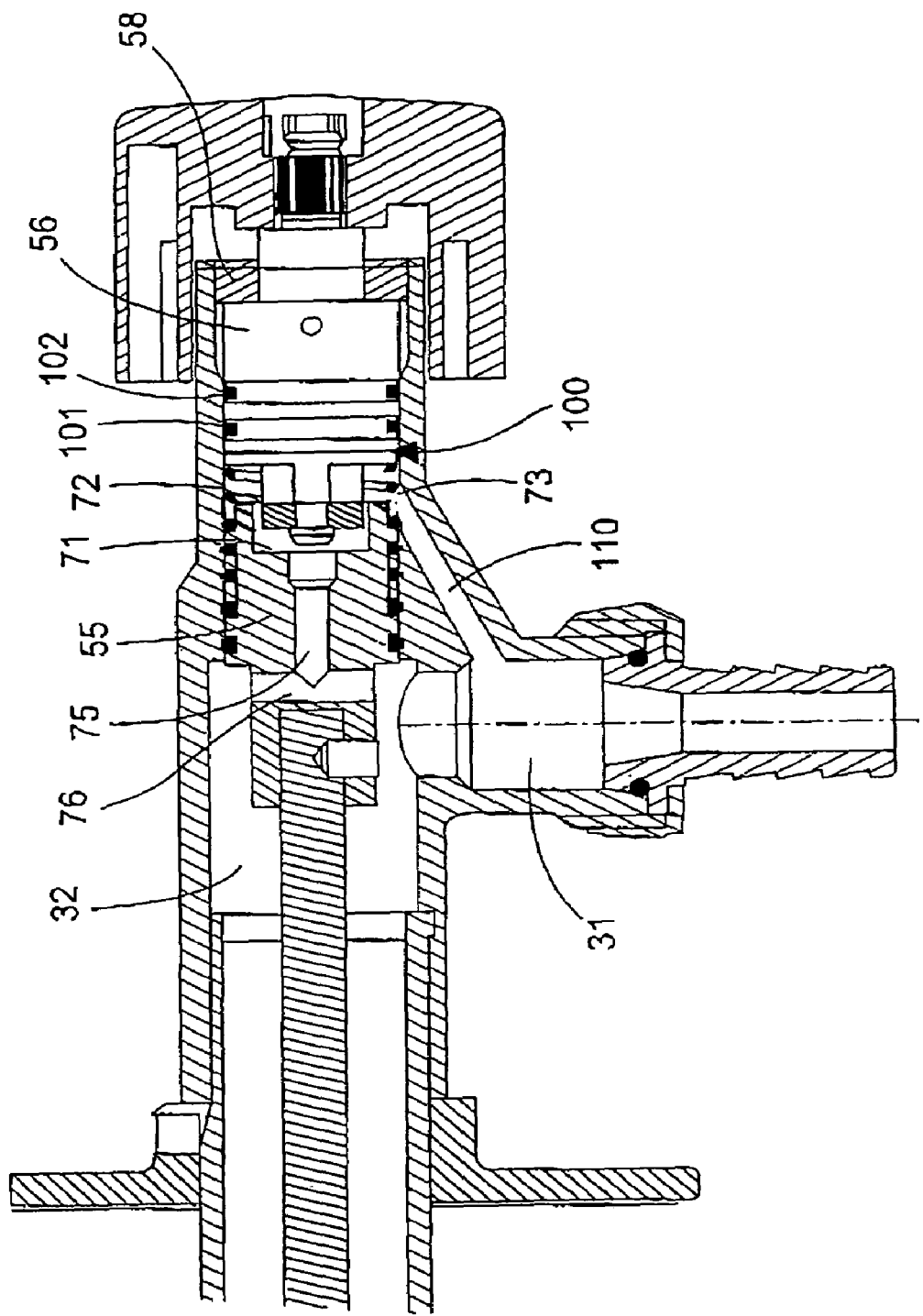
FIG. 3 shows a longitudinal section of a detail of the exterior section of the valve device of FIG. 1 with the ventilation valve open.
Figure 4:
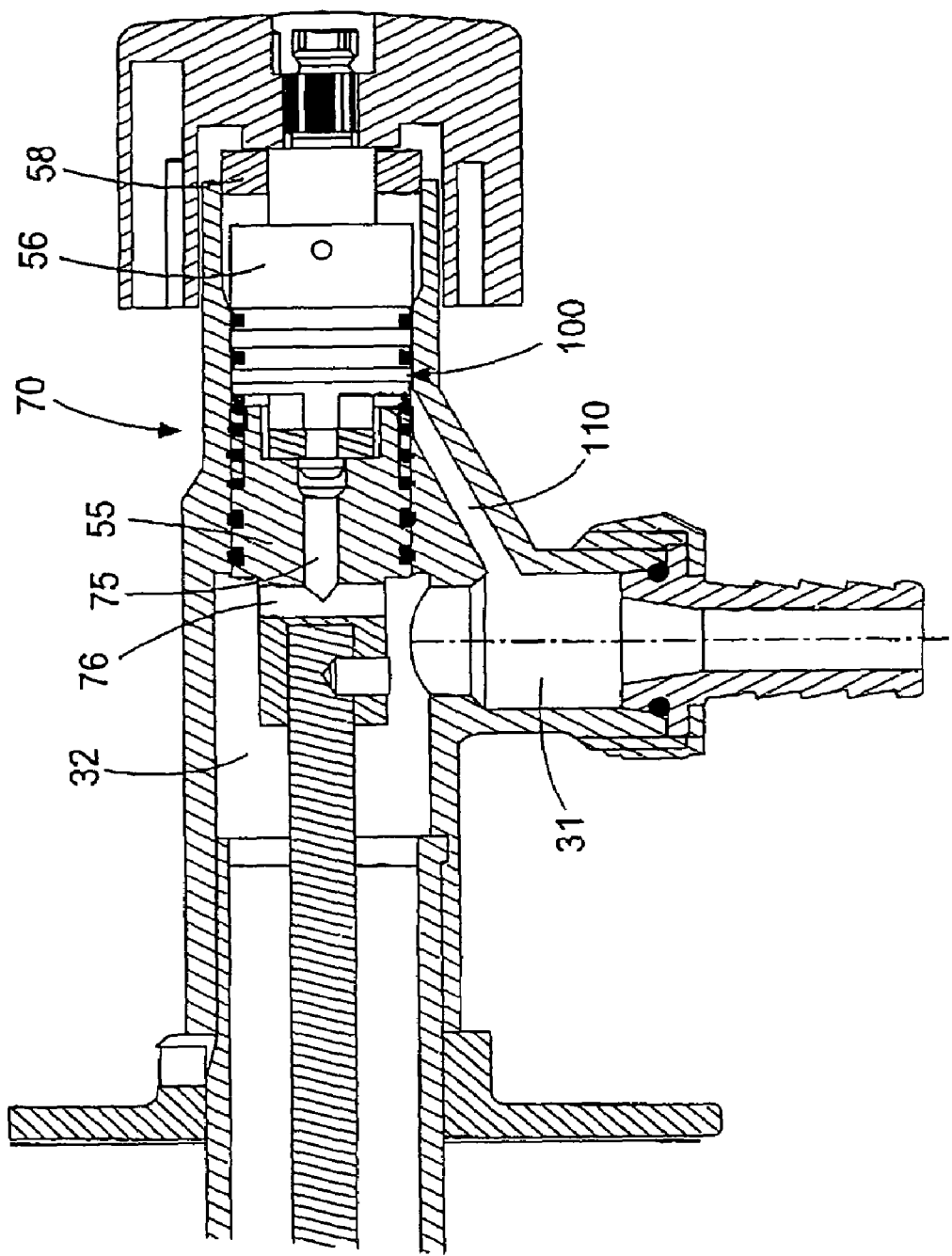
FIG. 4 shows a side view of a longitudinal section of the exterior section of the valve device of FIG. 1 with the ventilation valve closed.

Arranged between the actuating knob 57 and the pipe section 32 is a ventilation valve 70 that serves in ventilating the interior of the valve device. The design and function of the ventilation valve 70 will be described with the help of FIGS. 3 and 4.

The ventilation valve 70 comprises a valve seat 71 and a valve body 72. The valve body 72 is integrally formed with the valve sleeve 56. The valve seat 71 of the ventilation valve 70 is formed in the adapter element 55, which is inserted in the housing wall of the valve device and sealed by means of two O-rings. The adapter element 55 contains bores 75, 76, which provide fluid communication between the ventilation valve 70 and the connecting channel section 32.

A ventilation space 100 is situated between actuating knob 57 and the ventilation valve 70 and is sealed near the actuating knob by means of two O-rings 101, 102. A bypass channel 110 leads from the ventilation space 100 diagonally downward into the connecting channel section 31 in proximity of the discharge opening 20.

In this way, air can flow from the connecting channel section 31 to the connecting channel section 32 via a continuous bypass line, formed by the bypass channel 110, the ventilation space 100, and the bores 75,76.

A pressure spring 73 is supported on an annular shoulder of the housing wall and presses the valve sleeve 56 and the valve body 72, including the actuating knob 57 fastened thereto, outward.

As illustrated in FIG. 1, a radially arranged guide pin 120 is attached to the valve sleeve 56 and is guided in a guide-pin track 121 in a fixed wall section 122 of the valve device. The guide-pin track 121 allows the actuating knob 57, with the valve sleeve attached thereto, to be moved axially inward from a starting position, in which the main valve 40 is closed and the ventilation valve 70 is enabled, in the direction of the ventilation valve 70, whereby it forces the ventilation valve 70 to close by means of contact faces. When the ventilation valve 70 is in its closed position, the guide-pin track 121 allows the actuating knob 57 to be rotated by 90°. This rotation is transferred via the valve sleeve 56 to the adapter element 55 and further via the actuating rods 54, 52 to the valve body 42, which consequently is rotated into its open position.

When the actuating knob is rotated back by 90°, the spring element 73 automatically pushes the actuating knob and the valve body 72 back outward into the starting position. Thus, this allows water to drain from the interior of the valve device, since air can penetrate from the discharge opening 20 into the upper region of the valve device via the bypass line, which at the same time allows the residual water to drain from the valve device through the discharge opening 20.

However, if some pressure remains in the valve device, for example as a result of pressure in a connected hose, then this internal pressure will also be applied in the ventilation space 100 via the bypass line. Consequently, ventilation of the interior of the valve device does not take place, nor is it possible for liquid to penetrate to the exterior via the ventilation valve 70, if there is remaining internal pressure with the main valve 40 closed. This reliably prevents liquid from being discharged unintentionally through the ventilation valve 70.

Figure 5:
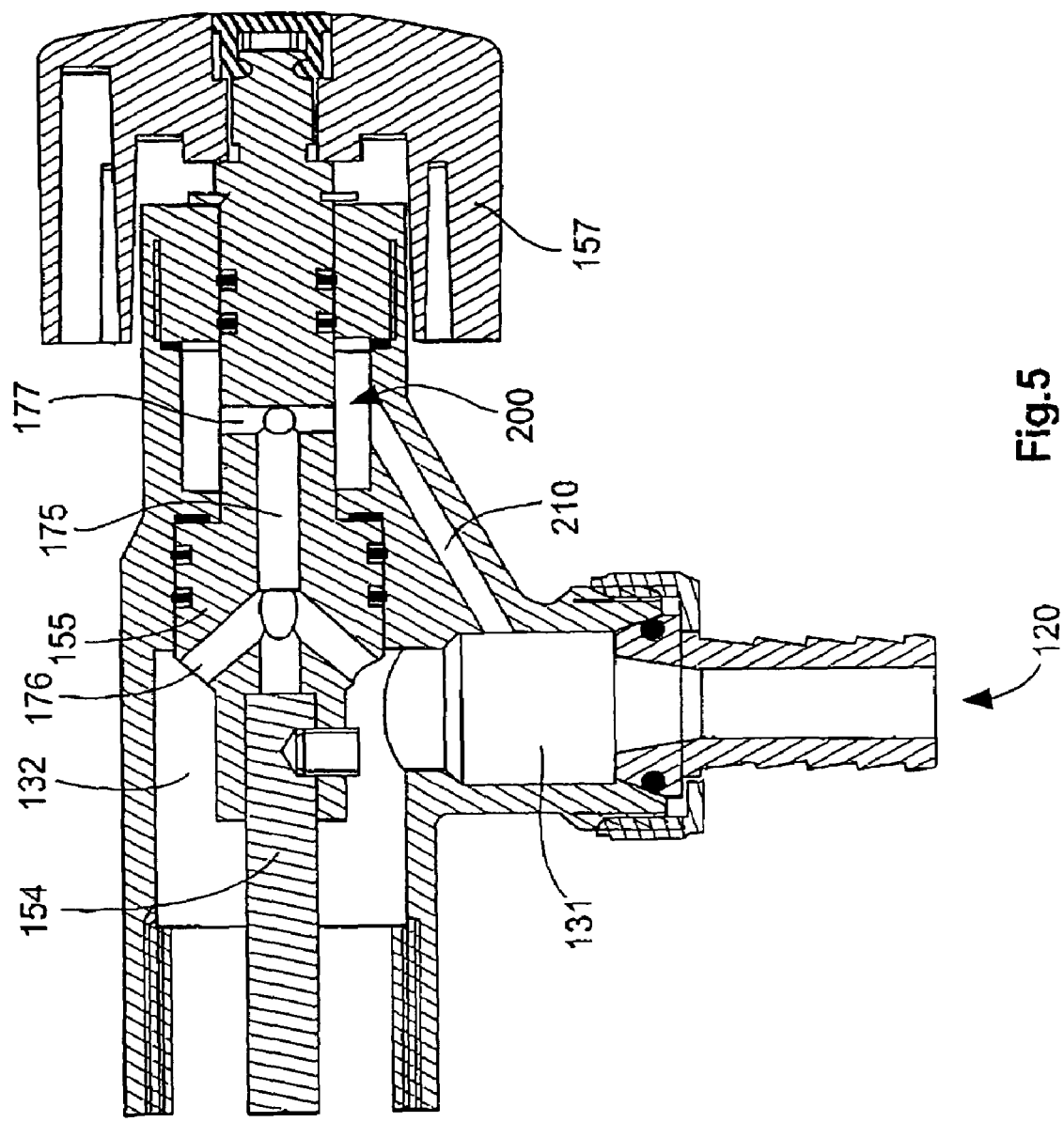
FIG. 5 shows a side view of a longitudinal section of the exterior section of a valve device according to a second embodiment of the invention.

FIG. 5 shows a valve device according to a second embodiment of the invention. This embodiment does not contain a ventilation valve and thus foregoes a forced opening by axial displacement (in particular pushing) of the actuating button.

The variant of the valve device illustrated in FIG. 5 also exhibits a actuating knob 157, which is connected rotationally rigid to a long actuating rod 154 via an adapter element 155. The adapter element 155 contains ventilation channels 175-177, which connect a bypass channel 210, extending from the proximity of a discharge opening 120 diagonally upward to a ventilation space 200, to a channel section above the orifice of the bypass channel 210. This ensures a permanently open connection between the lower channel section 131 and the upper channel section 132 via the bypass channel 210, the ventilation space 200, and the ventilation channels 175-177, guaranteeing a reliable ventilation of the interior of the valve device when the actuating knob 157 is moved from the open position to the closed position.

The actuating knob 157 in the embodiment shown in FIG. 5 is not axially movable but only can be rotated by an angle of 90° about the longitudinal axis of the exterior-wall valve. A connecting-link guide for control of the actuating knob 157 is no longer required in the embodiment shown in FIG. 5.

The invention claimed is:

1. A valve device for frost-proof exterior use, comprising: an inflow opening, a discharge opening, a connecting channel connecting the inflow opening to the discharge opening, a main valve, wherein the main valve opens a fluid connection through the connecting channel in an open operating position and blocks the connecting channel in a closed operating position, an actuating mechanism for actuating the main valve, and draining means for draining the valve device in the closed operating position, wherein the draining means comprise a bypass line downstream from the main valve connecting a first connecting channel section to a second connecting channel section, wherein the actuating mechanism opens and closes the draining means in response to moving the actuating mechanism along a first travel track and opens and closes the main valve in response to moving the actuating mechanism along a second travel track.

2. The valve device of claim 1, wherein in the installed position of the valve device, the second connecting channel section is situated above, with respect to the direction of gravity, the first connecting channel section.

3. The valve device of claim 1, wherein in the installed position of the valve device, the distance of the first connecting channel section from the discharge opening is smaller than that of the second connecting channel section.

4. The valve device of claim 1, wherein the bypass line connects the first connecting channel section to a ventilation space, which is connected to the second connecting channel section.

5. The valve device of claim 1, wherein the bypass line connects the first and the second connecting channel sections for all positions of the actuating mechanism.

6. The valve device of claim 1, wherein the draining means comprise a ventilation valve-arranged in the bypass line and in an open position allows access of ambient air into the connecting channel via the bypass line for the purpose of draining the liquid from the connecting channel, and prevents access in a closed position.

7. The valve device of claim 6, wherein the ventilation valve comprises one valve seat and one valve body, which in a first position of the actuating mechanism on a first travel track is pressed onto the valve seat and in a second position of the actuating mechanism on the first travel track is lifted off the valve seat.

8. The valve device of claim 6, wherein the actuating mechanism opens and closes the draining means in response to moving the actuating mechanism along the first travel track and opens and closes the main valve in response to moving the actuating mechanism along the second travel track, and wherein the first travel track serves in actuating the ventilation valve and the second travel track serves in actuating the main valve.

9. The valve device of claim 1, wherein the actuating mechanism comprises an actuating element that is moveable along the two travel tracks.

10. The valve device of claim 1, wherein the draining means comprise a ventilation opening, which allows access of ambient air into the connecting channel for the purpose of draining the liquid from the connecting channel via the discharge opening.

11. The valve device of claim 1, wherein a guiding mechanism for guiding the actuating mechanism along the first and the second travel track.

12. The valve device of claim 11, wherein the guiding device guides the actuating mechanism from a first, closed position, in which the main valve is closed and the draining means are in a draining position, in a first actuating phase along a first direction on the first travel track into a second position, in which the main valve is closed and the draining means are in a non-drain position, and in a second actuating phase along a first direction on the second travel track to a third, open position, in which the main valve is open and the draining means are in a non-drain position.

13. The valve device of claim 12, wherein the guiding device guides the actuating mechanism from the third, open position in a third actuating phase along a second direction on the second travel track--opposite to the motion of the second actuating phase—back to the second position, and in a fourth actuating phase along a second direction on the first travel track—opposite to the movement of the first actuating phase—back to the first position.

14. The valve device of claim 1, wherein the main valve comprises at least one valve element of a ceramic material.

15. The valve device of claim 14, wherein the main valve comprises two valve elements of a ceramic material.

16. The valve device of claim 1, wherein the valve device is configured for horizontal installation in an exterior wall.

17. The valve device of claim 1, wherein the actuating mechanism comprises a manually actuatable handle element that works together with a connecting rod, which extends through part of the connecting channel, to transfer the movement along the first travel track to the main valve.

18. The valve device of claim 1, wherein a first backflow prevention device is positioned between the inflow opening and the main valve, to prevent access of polluted water from the valve device through the inflow opening.

19. A valve device for frost-proof exterior use, comprising: an inflow opening, a discharge opening. a connecting channel connecting the inflow opening to the discharge opening, a main valve, wherein the main valve opens a fluid connection through the connecting channel in an open operating position and blocks the connecting channel in a closed operating position, an actuating mechanism for actuating the main valve, and draining means for draining the valve device in the closed operating position, wherein the draining means comprise a bypass line connecting a first connecting channel section to a second connecting channel section, wherein the actuating mechanism opens and closes the draining means in response to moving the actuating mechanism along a first travel track and opens and closes the main valve in response to moving the actuating mechanism along a second travel track, wherein the bypass line is formed in a section of the housing wall of the valve device and wherein in the installed position of the valve devices the bypass line extends from the ventilation space in at least one section downward in the direction of gravity toward the discharge opening.

20. A valve device for frost-proof exterior use, comprising: an inflow opening, a discharge opening, a connecting channel connecting the inflow opening to the discharge opening, a main valve, wherein the main valve opens a fluid connection through the connecting channel in an open operating position and blocks the connecting channel in a closed operating position, an actuating mechanism for actuating the main valve, and draining means for draining the valve device in the closed operating position, wherein the draining means comprise a bypass line connecting a first connecting channel section to a second connecting channel section, wherein the actuating mechanism opens and closes the draining means in response to moving the actuating mechanism along a first travel track and opens and closes the main valve in response to moving the actuating mechanism along a second travel track, wherein the second travel track is a rotary travel track and the first travel track is a translatory travel track oriented axially relative to the rotary travel track.

21. A valve device for frost-proof exterior use, comprising: an inflow opening, a discharge opening, a connecting channel connecting the inflow opening to the discharge opening, a main valve, wherein the main valve opens a fluid connection through the connecting channel in an open operating position and blocks the connecting channel in a closed operating position, an actuating mechanism comprising a connecting-link guide for actuating the main valve, and draining means for draining the valve device in the closed operating position, wherein the draining means comprise a bypass line connecting a first connecting channel section to a second connecting channel section, wherein the actuating mechanism opens and closes the draining means in response to moving the actuating mechanism along a first travel track and opens and closes the main valve in response to moving the actuating mechanism along a second travel track, wherein the connecting-link guide comprises at least one pin, which is connected to a housing section of the valve device or to an element of the actuating means, and one guide-pin track, which guides the pin and is correspondingly formed at an element of the actuating means or at the housing of the valve device.

22. A valve device for frost-proof exterior use, comprising: an inflow opening, a discharge opening, a connecting channel connecting the inflow opening to the discharge opening, a main valve comprising a rotary slide valve, wherein the main valve opens a fluid connection through the connecting channel in an open operating position and blocks the connecting channel in a closed operating position, an actuating mechanism for actuating the main valve, and draining means for draining the valve device in the closed operating position, wherein the draining means comprise a bypass line connecting a first connecting channel section to a second connecting channel section, wherein the actuating mechanism opens and closes the draining means in response to moving the actuating mechanism along a first travel track and opens and closes the main valve in response to moving the actuating mechanism along a second travel track, wherein the main valve comprises a first valve element with at least one flow opening and a second valve element, which is rotatable about an axis and comprises at least one eccentric sealing face, which blocks the at least one flow opening of the first valve element in the closed operating position.

23. The valve device of claim 22, wherein the axial distance between the first valve element and the second valve element is the same in the open and the closed operating position.

24. The valve device of claim 22, wherein the first valve element is embodied as disk with two eccentric openings.

25. A valve device for frost-proof exterior use, comprising: an inflow opening, a discharge opening, a connecting channel connecting the inflow opening to the discharge opening, a main valve, wherein the main valve opens a fluid connection through the connecting channel in an open operating position and blocks the connecting channel in a closed operating position, an actuating mechanism for actuating the main valve, and draining means for draining the valve device in the closed operating position, wherein the draining means comprise a bypass line connecting a first connecting channel section to a second connecting channel section, wherein the actuating mechanism opens and closes the draining means in response to moving the actuating mechanism along a first travel track and opens and closes the main valve in response to moving the actuating mechanism along a second travel track, wherein the actuating mechanism must be turned by approximately 90 degrees to reach the closed operating position from the open operating position.

26. A valve device for frost-proof exterior use, comprising: an inflow opening, a discharge opening, a connecting channel, which connects the inflow opening to the discharge opening, a main valve, which is embodied to open the fluid connection through the connecting channel in an open operating position and to block it in a closed operating position, an actuating mechanism for actuating the main valve, and draining means for draining the valve device in the closed operating position, wherein the draining means comprise a bypass line downstream from the main valve connecting a first connecting channel section to a second connecting channel section, wherein the actuating mechanism is configured so that it opens and closes the draining means in response to moving the actuating mechanism along a first travel track and opens and closes the main valve in response to moving the actuating mechanism along a second travel track.

* * * * *